: 3,029,187
GELATIN ADHESIVE PHARMACEUTICAL PREPARATIONS

David W. Steinhardt, 1495 Jay St., Rochester, N.Y.; Amos Steinhardt and Franklin A. Goldwater, executors of said David W. Steinhardt, deceased
No Drawing. Filed Feb. 20, 1958, Ser. No. 716,283
6 Claims. (Cl. 167—69)

This invention relates to new compositions of matter and more particularly to a new pharmaceutical preparation useful as a denture adhesive and/or as a vehicle for the topical administration of pharmacologically active materials.

Prior to the present invention, available denture adhesives have been found to be deficient in many characteristics. Many of the adhesives heretofore known have been found to be troublesome in their application to mucous membranes of the mouth; during use have resulted in an unevenness of spreading on the palate underneath dentures; have necessitated replacement within the dentures many times during the course of the day; have not been pleasant to wear and, possess a distinct taste.

It has now been found that by the use of the compositions of this invention, these various disadvantages can be overcome in that these compositions can be more easily applied to the mucous membranes and more evenly spread on the denture and thence on the palate during use; possess a longer duration of useful activity; possess superior retentive properties; are pleasant to wear; are tasteless; and, possess the additional and most important feature of enabling a better fit for the denture, thereby reducing the irritation which would naturally result from an ill-fitting denture.

In the ordinary use of full dentures or dental plates, there is often an imperfect fit due to shrinkage of the gums and/or other reasons. The compositions of this invention, when applied to these dental plates, act as a retentive agent and permit satisfactory adaptation of denture to tissue by virtue of their fill-in, sealing, and setting properties.

It is therefore an object of this invention to provide a composition of matter useful as a denture adhesive which is safe and effective, may be easily applied to the dentures, and is effective over an extended period of time.

Additionally, the compositions of this invention may be used as a vehicle for the topical application of pharmacologically active materials to the mucous membranes of the body and especially to those of the oral cavity. Pharmacologically active materials (medicaments, therapeutic agents) when incorporated into the compositions of this invention and thus applied to mucous membranes are retained for longer periods of time than heretofore possible, thereby enabling greater and more effective exposure of the mucous membrane to the medicament.

The compositions of this invention essentially comprise an intimate admixture of particulate (e.g. finely divided) gelatin and a topically-acceptable vehicle, the gelatin preferably representing about 5–75% by weight of the composition and optimally about 10–50%.

Topically-acceptable vehicles utilizable, include, inter alia, petrolatum, lanolin, benzoinated lard, hydrogenated cotton seed oil, carboxymethylcellulose, pectin, karaya gum, tragacanth, Irish moss extracts, alginates, polyvinyl pyrrolidone, carbo gum, guar gum and pre-treated water-soluble starch (e.g. Nu Film, National Starch Products).

Agents to vary the color and/or taste features [e.g. essential oils, synthetic aromatics or other similar flavoring materials (for taste) and, suitable oil-soluble Food Drug and Cosmetic or Drug and Cosmetic dyes or inert pigments (for color)] may be utilized in the compositions of this invention.

When desired there may be added to the compositions of this invention when intended for use as a dental adhesive, preservatives [e.g. methyl paraben, propylparaben, other esters of parahydroxybenzoic acid, sorbic acid, volatile oils (e.g. peppermint, wintergreen, cinnamon), benzoic acid and its salts]; antiseptics, [e.g. hexachlorophene, tetramethyl thiuramdisulfide, benzalkonium chloride, hexylresorcinol, cresols (e.g. Cresatin, Merck-Sharp and Dohme), zinc oxide, methylene blue, boric acid, chloramine-T, gentian violet, acroflavin, thiomersal, phenyl mercuric acetate, phenyl mercuric chloride, phenyl mercuric nitrate basic]; antioxidants [butyl hydroxy anisole, butyl hydroxytoluene]; and oxidizing agents [e.g. sodium perborate, a metallic peroxide (e.g. sodium peroxide), sodium permanganate and the halogens].

Pharmacologically active materials utilizable when said compositions are to serve as vehicles include, inter alia, topical anesthetics, corticosteroids, hormones, vitamins, antibiotics, antiseptics, deodorants (e.g. charcoal, chlorophyll), tissue growth promoters (Peruvian Balsam), demulcents, enzymes (e.g. hyaluronidase), protective agents, antacids, astringents diagnostic agents (e.g. fluorescin), vasoconstrictors (e.g. epinephrine), caries prophylactic and/or inhibiting agents (e.g. sodium stannous fluoride) and autonomic drugs (e.g. acetylcholine).

The following examples are illustrative but not limitative of the invention:

Example I

|  | Gm. |
|---|---|
| Gelatin (finely powdered) | 50 |
| Petrolatum | 50 |

Introduce the gelatin into the bowl of a planetary type mixer (e.g. Hobart, Glen, Pony). Add the petrolatum with stirring until a homogeneous mixture is obtained.

Example II

|  | Gm. |
|---|---|
| Gelatin (finely powdered) | 50 |
| Hexachlorophene (finely powdered) | 1 |
| Petrolatum | 49 |

(a) Blend the hexachlorophene with an equal weight of the petrolatum in a planetary type mixer and then pass the material through a roller mill (e.g. Ross Engineering Co. Roller Mill). Add to the 2 gm. of blended material 2 additional gm. of petrolatum and again mix in the planetary type mixer until homogeneous. Continue this geometric dilution until the petrolatum has been completely utilized.

(b) Introduce the gelatin into the bowl of the planetary type mixer. Cover the gelatin with (a) and blend until homogeneous.

Example III

|  | Gm. |
|---|---|
| Gelatin (finely powdered) | 16.6 |
| Pectin (finely powdered) | 16.6 |
| Carboxymethylcellulose (finely powdered) | 16.6 |
| Petrolatum | 50.0 |

(a) Thoroughly mix the gelatin, pectin and carboxymethylcellulose in a powder blender (e.g. Hobart Mixer).

(b) Introduce (a) and the petrolatum into the bowl of the mixer, covering (a) with the petrolatum and mix until homogeneous.

Example IV

|  | Gm. |
|---|---|
| Gelatin (finely powdered) | 33.3 |
| Pectin (finely powdered) | 33.3 |
| Carboxymethylcellulose (finely powdered) | 33.3 |

Introduce the three ingredients into the bowl of a planetary type mixer and stir until thoroughly blended.

Example V

| | Gm. |
|---|---|
| Gelatin (finely powdered) | 25 |
| Pectin (finely powdered) | 25 |
| Carboxymethylcellulose (finely powdered) | 25 |
| Karaya gum (finely powdered) | 25 |

Introduce the above into the bowl of a planetary type mixer and stir until thoroughly blended.

Example VI

| | Gm. |
|---|---|
| Gelatin (finely powdered) | 50 |
| Tragacanth (finely powdered) | 50 |

Introduce the above into the bowl of a planetary type mixer and stir until thoroughly blended.

The invention may be variously otherwise embodied within the scope of the appended claims.

What is claimed is:

1. An anhydrous adhesive pharmaceutical composition consisting essentially of an intimate admixture of from about 5% to about 75% of particulate gelatin together with pectin and carboxymethylcellulose.

2. An anhydrous adhesive pharmaceutical composition consisting essentially of an intimate admixture of from about 5% to about 75% of particulate gelatin together with pectin.

3. An anhydrous adhesive pharmaceutical composition consisting essentially of an intimate admixture of from about 5% to about 75% of particulate gelatin and petrolatum.

4. An anhydrous adhesive pharmaceutical composition consisting essentially of an intimate admixture of from about 10% to about 50% of particulate gelatin together with pectin, carboxymethylcellulose, a pharmacologically active material and a topically acceptable vehicle applicable to the mucous membranes.

5. An anhydrous adhesive pharmaceutical composition consisting essentially of an intimate admixture of from about 10% to about 50% of particulate gelatin together with pectin, a pharmacologically active material and a topically acceptable vehicle applicable to the mucous membranes.

6. An anhydrous adhesive pharmaceutical composition consisting essentially of an intimate admixture of from about 10% to about 50% of particulate gelatin together with pectin, carboxymethylcellulose and a pharmacologically active material.

References Cited in the file of this patent

UNITED STATES PATENTS

| | | |
|---|---|---|
| 250,675 | Osgood | Dec. 13, 1881 |
| 337,346 | Muller | Mar. 2, 1886 |
| 740,040 | Perkiewicz | Sept. 29, 1903 |
| 2,178,569 | Ferguson | Nov. 7, 1939 |
| 2,183,084 | Reynolds | Dec. 12, 1939 |
| 2,387,056 | Buck et al. | Oct. 16, 1945 |
| 2,841,498 | Cahn et al. | July 1, 1958 |

OTHER REFERENCES

Coblentz: The Newer Remedies, 3rd. ed., Blakiston's Son & Co., Phila., Pa. (1899), p. 64.

Alexander: Glue and Gelatine, Chem. Catalog Co., N.Y. (1923), pp. 200–204.

Gordon: J. A. Dental A., December 1934, pp. 2217–2218.

Crossen et al.: Lea and Febriger, Phila., Pa., (1952), p. 212.

Drug and Cosmetic Industry, 77:6, Dec. 1955, p. 836 (rt. col.)

Remington, Practice of Pharmacy, 11th ed., Mack Publ. Co., Easton, Pa., 1956, p. 345.

Merck Index, 6th ed., Merck & Co., Inc., Rahway, New Jersey, (1952), page 316.

Hackh: Chem. Dictionary. 3rd ed., McGraw-Hill Book Co., N.Y. (1944), page 372.